Figure 1:
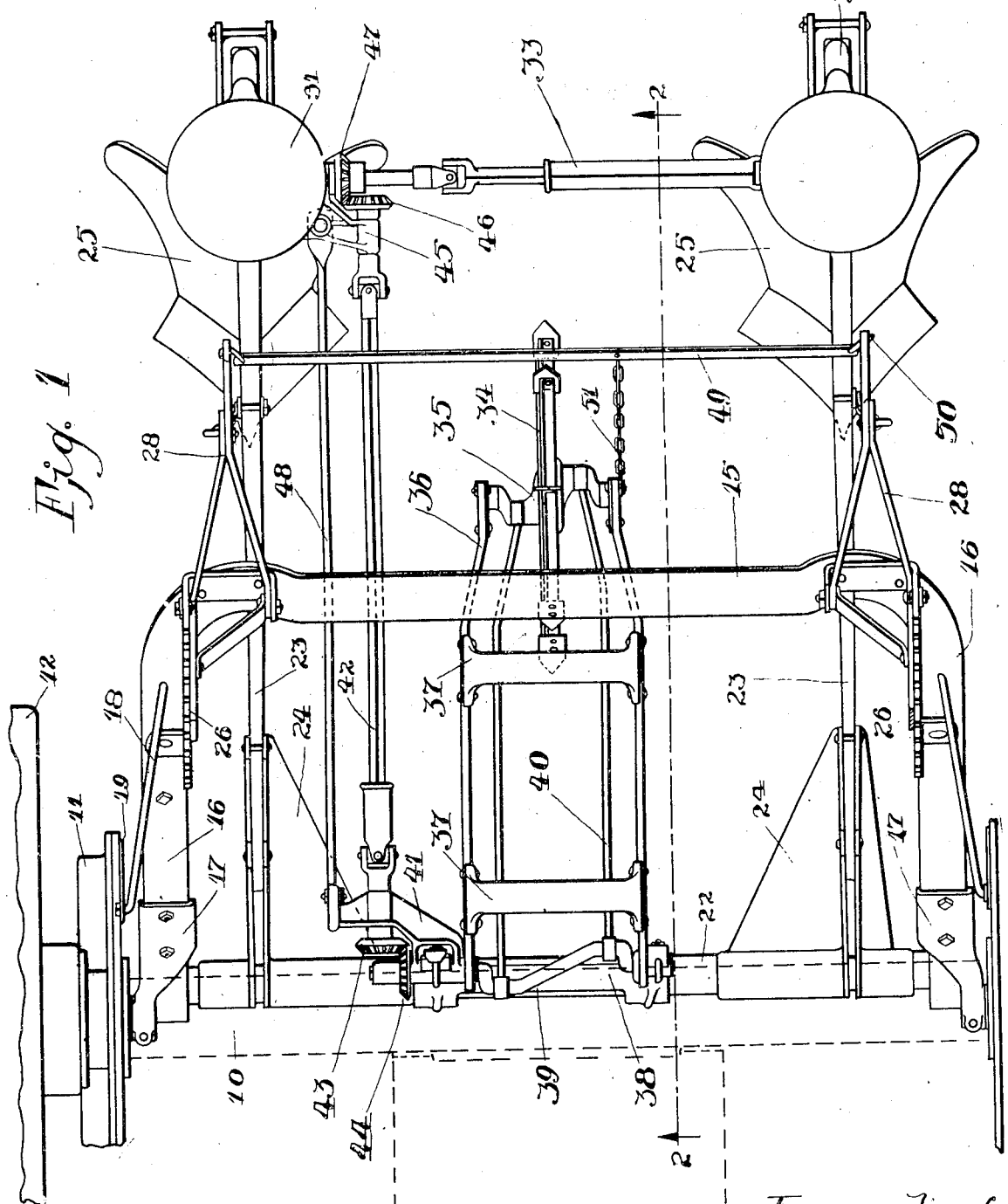

July 17, 1928.

A. C. LINDGREN ET AL 1,677,482

TRACTOR ATTACHMENT

Filed Sept. 17, 1926

2 Sheets-Sheet 1

Inventors
Alexus C Lindgren
and Arthur D Gallagher
By N. P. Doolittle
Atty

July 17, 1928.
A. C. LINDGREN ET AL
1,677,482
TRACTOR ATTACHMENT
Filed Sept. 17, 1926
2 Sheets-Sheet 2
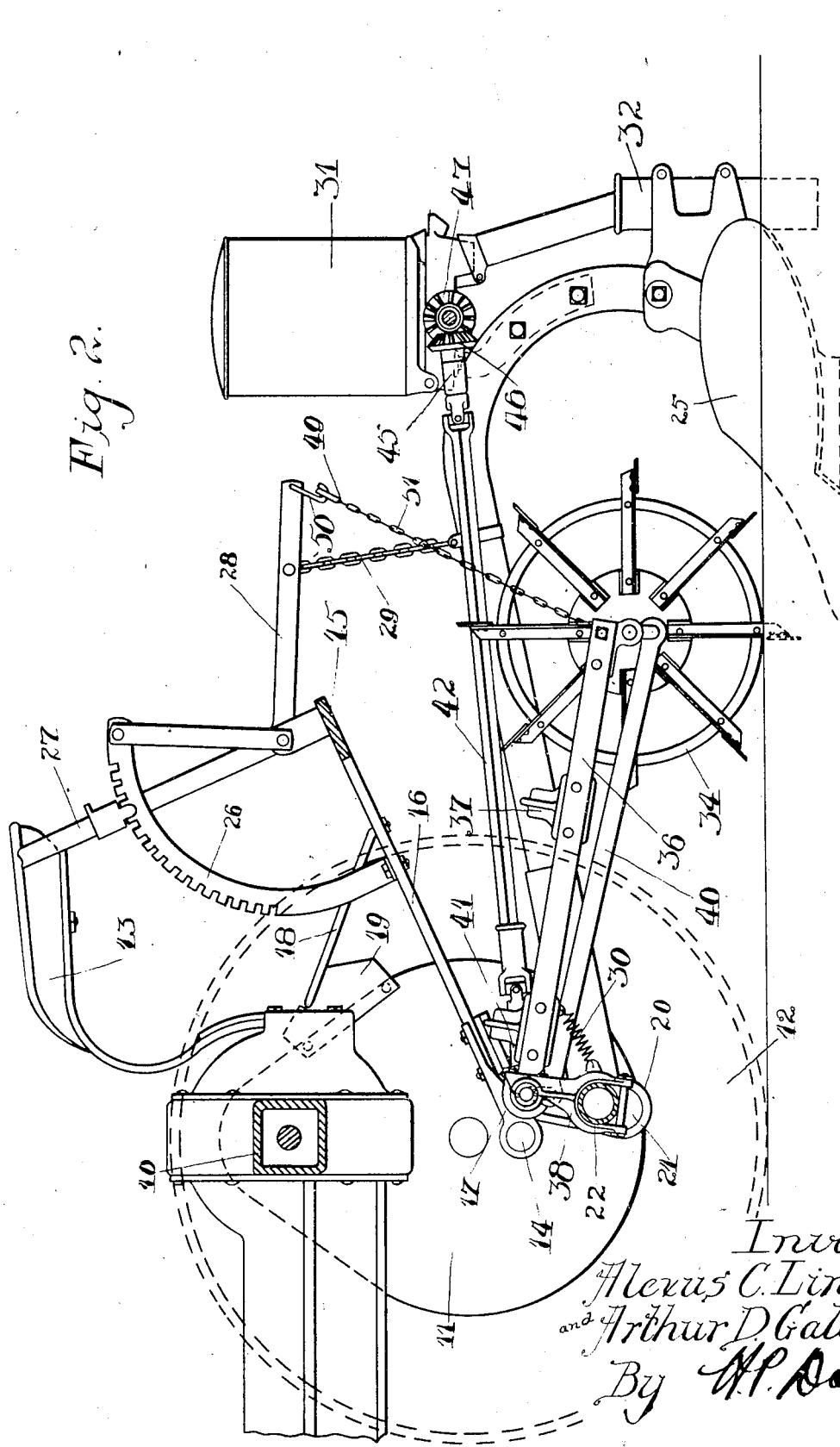
Inventors.
Alexus C. Lindgren
and Arthur D. Gallagher.
By W. P. Doolittle
Atty Patented July 17, 1928.

1,677,482

UNITED STATES PATENT OFFICE.

ALEXUS C. LINDGREN, OF CHICAGO, AND ARTHUR D. GALLAGHER, OF CANTON, ILLINOIS, ASSIGNORS TO INTERNATIONAL HARVESTER COMPANY, OF CHICAGO, ILLINOIS, A CORPORATION OF NEW JERSEY.

TRACTOR ATTACHMENT.

Application filed September 17, 1926. Serial No. 136,072.

This invention relates to tractor operated farm tools and particularly means for operating planting mechanism behind a tractor.

The main object of the invention is to provide a planting attachment of simple structure that will be directly connectible to the rear of a tractor and be supported thereby. A further object is to provide simple and efficient means on such structure for driving the planting mechanism and controlling its operation. In its specific aspect the purpose of the invention is to provide a planting attachment capable of use with middle breaker plows in the practice of lister planting, the attachment herein disclosed being particularly adapted for use in conjunction with a middle breaker plow attachment of the type described and claimed in assignee's copending application Serial No. 731,104, filed August 9, 1924.

The objects stated, as well as other objects and advantages which will be apparent to those skilled in the art to which the invention relates, are attained by providing a supporting structure for attachment to a tractor and on which planting units are carried in a novel manner and driven from a novel form of driving mechanism carried on the supporting structure including a source of power such as a ground engaging trailer wheel.

Referring to the drawings,—

Fig. 1 is a plan view showing the rear end of a tractor carrying an attachment embodying the invention; and Fig. 2 is a sectional side view on the line 2—2 Fig. 1.

The invention is illustrated in combination with the rear portion of a tractor having a wide tread and comprising an arched rear axle structure having a transverse housing 10 and depending housings 11 fixed to the ends of the transverse housing and containing transmission mechanism for the spindles of the traction wheels 12. The central portion of the housing, enclosing the differential, carries the operator's seat 13. On the inner surfaces of the housings 11 there are inwardly projecting trunnions or pintles 14 which are the supporting elements for the arms of a rearwardly projecting arched or U-shaped frame member 15 forming part of a draft frame. The member 15 is preferably a rigid flat metal bar with a straight transverse portion and arms 16 extending at right angles therefrom. The arms 16 carry detachable bearing brackets 17 which are mounted on the pintles 14. Suspension links 18 connect the arms 16 with brackets 19 fixed on the housings 11.

Beneath the forward end of each arm 16 there is secured a depending draft bracket 20 (Fig. 2) which is preferably a bar looped or bent to provide a substantially vertical slot or guide-way 21 and having its ends fixed to the under side of the arm. The guide-ways 21 receive the ends of a transverse draft bar 22 to which the forward ends of plow beams 23 are fastened by means of brace plates 24. These beams are equipped with middle breaker bottoms 25. At each side of the frame bar 15 there is secured an upright arcuate rack bracket 26 carrying a lifting lever 27 having the usual latch for cooperation with the rack of bracket 26 and a rearwardly extending crank-arm 28 connected between its ends to the plow beam below by a lifting link or chain 29. A separate lift is thus provided for each plow and actuation of either lever 27 will cause the associated beam and parts carried thereby to be shifted bodily in a vertical direction the forward end of each beam being permitted to move vertically by reason of the free movement of the ends of bar 22 in the guide-ways 21, upward movement therein being assisted by tension springs 30 (Fig. 2).

The structure so far described is, in all essentials, that more particularly described and claimed in the copending application above mentioned and is included in the present invention to the extent that it is included in and cooperates with the additional structure now to be described.

In order to make a novel and simple planting attachment out of the organization heretofore described, each of the plow beams 23 has a seed hopper 31, containing any preferred seed dispensing mechanism, mounted on it above the plow body with the seed boot 32 located behind the middle breaker plow as usual for lister planters. Both dispensing mechanisms are preferably driven by a single seed plate driving shaft 33 which is both flexible and telescopic in order to permit independent movement of the plow beams. Power for driving this shaft is obtained from a ground contacting drive wheel 34 fixed to a double crank shaft 35 journaled on the rear end of a trailer frame 36 which is preferably composed of spaced longitudinal bars connected by transverse arched castings 37 which both brace and give necessary weight to the frame. The front end of the trailer frame is connected to a clamp bracket 38, having clamp collars surrounding bar 22. This bracket has upstanding bearing arms on its ends in which a double cranked counter shaft 39 is journaled, the ends of this shaft serving as points of pivotal connection for the trailer frame. The respective cranks of shafts 35 and 39 are opposed and connected by pitmen rods 40 and rotation of wheel 34 is thus transmitted to shaft 39, this structure constituting but one preferred manner of effecting this drive. At one end the bracket is formed with a laterally projecting bearing arm 41 in which is journaled the forward end of a connecting drive shaft 42. A bevel pinion 43 on this end of the shaft is in mesh with a similar pinion 44 on the end of shaft 39. The rear end of shaft 42 is journaled and supported in a bracket 45 projecting from the base casting of one of the seed dispensing devices and has a pinion 46 meshing with a pinion 47 fixed on shaft 33 adjacent one of the planting units. The shaft 42 is provided with universal joints and is preferably composed of telescopically related sections, as shown, so that relative movements in the parts of the attachment may occur without affecting the operation of the planting devices. A brace rod 48 is pivoted on bracket arm 41 and extends to bracket 45 in parallel relation to the shaft 42.

Mechanism is provided for lifting the trailing frame when either or both of the plow beams are lifted and this preferably consists of a transverse bar 49 suspended, as by hooks 50, from the extreme ends of the lifting arms 28. At a point near its middle the bar 49 is connected, as by a chain 51, with the rear or free end of the trailing frame 36. It is to be noticed that the lifting connection 51 has its effective point of connection to arms 28 farther removed from the axis of said arms than the lifting connections 29 to the beams. Therefore, lifting of either beam will impart an increased degree of movement to one end or the other of bar 49 a sufficient amount of which will be transmitted through chain 51 to raise the trailing frame high enough to bring wheel 34 out of contact with the ground and stop operation of the planting mechanism. Lifting of both beams for transport purposes will, of course, increase the height to which the trailing frame is raised by lifting of one beam only.

In its broadest aspect the construction and arrangement disclosed affords a planter attachment for tractors which is directly supported on the tractor instead of on supporting wheels and which includes self contained means for driving the planting mechanism. In its more specific aspect the structure represents a planting attachment capable of being added to or mounted on a plowing attachment of known construction.

While the structure described exemplifies a preferred embodiment of the invention, it is capable of considerable variation within the scope of the following claims.

What is claimed is:

1. The combination with a tractor, of an implement attachment comprising a transverse draft bar, means for pivotally supporting said draft bar on the tractor, an implement beam secured to each outer portion of said draft bar, a driven implement carried thereby, a trailing frame pivoted on the central portion of said draft bar, a ground engaging drive wheel journaled in said frame, driving connections between said wheel and implement, means on the tractor for lifting and lowering each implement beam individually, and means for lifting and lowering the trailing frame upon actuation of either beam lift.

2. The combination with a tractor, of an implement attachment comprising a transverse draft bar, means for pivotally supporting said bar on the tractor, an implement beam secured to each outer portion of said draft bar, a planting device mounted on each beam, a trailing frame pivoted on the central portion of said draft bar, a ground engaging drive wheel journaled in said frame, driving connections between said wheel and the planting devices, a lifting lever mounted on the tractor over each implement beam and having a crank-arm connected with the adjacent beam, a cross-link connecting said crank-arms, and a lifting connection between the trailing frame and the cross-link.

3. In a planting attachment for tractor drawn plows of the type having beams connected to a draft frame on the tractor and means for lifting and lowering the beams, the combination of planting devices adapted for mounting on the respective beams, driving means for said devices comprising a frame adapted to be pivoted on the draft frame to trail adjacent said beams, a ground engaging drive wheel on said trailing frame, flexible driving connections between said wheel and the planting devices, and lifting means for the trailing frame adapted for connection to the beam lifting means.

4. A planter attachment for tractors comprising a supporting frame having means for rigid attachment to the rear of a tractor to extend rearwardly, a pair of floating beams suspended from said frame, a planting device on each beam, a ground wheel carried on a separate floating connection with said frame, driving connections between said wheel and the planting devices, and means on the supporting frame for raising and lowering the beams and ground wheel.

5. A planter attachment for tractors comprising a supporting frame having means for rigid attachment to the rear of a tractor to extend rearwardly, a pair of floating beams carried on members supported only by said frame, a planting device on each beam, and separate means also carried by said frame for driving the planting mechanism comprising flexible driving shafts connecting the planting devices to said driving means.

In testimony whereof we affix our signatures.

ALEXUS C. LINDGREN.
ARTHUR D. GALLAGHER.